US008860816B2

(12) United States Patent
Corcoran et al.

(10) Patent No.: US 8,860,816 B2
(45) Date of Patent: *Oct. 14, 2014

(54) SCENE ENHANCEMENTS IN OFF-CENTER PERIPHERAL REGIONS FOR NONLINEAR LENS GEOMETRIES

(75) Inventors: Peter Corcoran, Claregalway (IE); Petronel Bigioi, Galway (IE); Piotr Stec, Galway (IE)

(73) Assignee: Fotonation Limited, Ballybrit, Galway (IE)

( * ) Notice: Subject to any disclaimer, the term of this patent is extended or adjusted under 35 U.S.C. 154(b) by 485 days.

This patent is subject to a terminal disclaimer.

(21) Appl. No.: 13/077,891

(22) Filed: Mar. 31, 2011

(65) Prior Publication Data
US 2012/0249841 A1 Oct. 4, 2012

(51) Int. Cl.
*H04N 5/225* (2006.01)
*H04N 13/04* (2006.01)

(52) U.S. Cl.
USPC ............................................ 348/169; 348/52

(58) Field of Classification Search
USPC ................... 348/335, 360–361, 36–39, 143, 348/169–172; 382/275, 276, 254
See application file for complete search history.

(56) References Cited

U.S. PATENT DOCUMENTS

| | | | |
|---|---|---|---|
| 5,508,734 A | 4/1996 | Baker et al. | |
| 5,724,456 A | 3/1998 | Boyack et al. | |
| 5,818,975 A | 10/1998 | Goodwin et al. | |
| 5,978,519 A | 11/1999 | Bollman et al. | |
| 5,991,456 A | 11/1999 | Rahman et al. | |
| 6,035,072 A | 3/2000 | Read | |
| 6,097,470 A | 8/2000 | Buhr et al. | |
| 6,101,271 A | 8/2000 | Yamashita et al. | |
| 6,192,149 B1 | 2/2001 | Eschbach et al. | |
| 6,249,315 B1 | 6/2001 | Holm | |
| 6,268,939 B1 | 7/2001 | Klassen et al. | |
| 6,282,317 B1 | 8/2001 | Luo et al. | |
| 6,393,148 B1 | 5/2002 | Bhaskar | |
| 6,407,777 B1 | 6/2002 | DeLuca | |
| 6,421,468 B1 | 7/2002 | Ratnakar et al. | |
| 6,438,264 B1 | 8/2002 | Gallagher et al. | |
| 6,456,732 B1 | 9/2002 | Kimbell et al. | |
| 6,459,436 B1 | 10/2002 | Kumada et al. | |
| 6,473,199 B1 | 10/2002 | Gilman et al. | |
| 6,504,951 B1 | 1/2003 | Luo et al. | |
| 7,042,505 B1 | 5/2006 | DeLuca | |
| 7,206,461 B2 | 4/2007 | Steinberg et al. | |
| 7,269,292 B2 | 9/2007 | Steinberg | |

(Continued)

OTHER PUBLICATIONS

Co-pending U.S. Appl. No. 12/572,930.

(Continued)

*Primary Examiner* — Mekonnen Dagnew
(74) *Attorney, Agent, or Firm* — Hickman Palermo Truong Becker Bingham Wong LLP

(57) ABSTRACT

A technique of enhancing a scene containing one or more off-center peripheral regions within an initial distorted image captured with a large field of view includes determining and extracting an off-center region of interest (hereinafter "ROI") within the image. Geometric correction is applied to reconstruct the off-center ROI into a rectangular or otherwise undistorted or less distorted frame of reference as a reconstructed ROI. A quality of reconstructed pixels is determined within the constructed ROI. Image analysis is selectively applied to the reconstructed ROI based on the quality of the reconstructed pixels.

33 Claims, 8 Drawing Sheets
(4 of 8 Drawing Sheet(s) Filed in Color)

(56) References Cited

U.S. PATENT DOCUMENTS

| | | |
|---|---|---|
| 7,295,233 B2 | 11/2007 | Steinberg et al. |
| 7,308,156 B2 | 12/2007 | Steinberg et al. |
| 7,310,450 B2 | 12/2007 | Steinberg et al. |
| 7,315,630 B2 | 1/2008 | Steinberg et al. |
| 7,315,631 B1 | 1/2008 | Corcoran et al. |
| 7,315,658 B2 | 1/2008 | Steinberg et al. |
| 7,317,815 B2 | 1/2008 | Steinberg et al. |
| 7,336,821 B2 | 2/2008 | Ciuc et al. |
| 7,340,109 B2 | 3/2008 | Steinberg et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,424,170 B2 | 9/2008 | Steinberg et al. |
| 7,436,998 B2 | 10/2008 | Steinberg et al. |
| 7,440,593 B1 | 10/2008 | Steinberg et al. |
| 7,460,694 B2 | 12/2008 | Corcoran et al. |
| 7,460,695 B2 | 12/2008 | Steinberg et al. |
| 7,466,866 B2 | 12/2008 | Steinberg |
| 7,469,055 B2 | 12/2008 | Corcoran et al. |
| 7,469,071 B2 | 12/2008 | Drimbarean et al. |
| 7,471,846 B2 | 12/2008 | Steinberg et al. |
| 7,474,341 B2 | 1/2009 | DeLuca et al. |
| 7,506,057 B2 | 3/2009 | Bigioi et al. |
| 7,515,740 B2 | 4/2009 | Corcoran et al. |
| 7,536,036 B2 | 5/2009 | Steinberg et al. |
| 7,536,060 B2 | 5/2009 | Steinberg et al. |
| 7,536,061 B2 | 5/2009 | Steinberg et al. |
| 7,545,995 B2 | 6/2009 | Steinberg et al. |
| 7,551,754 B2 | 6/2009 | Steinberg et al. |
| 7,551,755 B1 | 6/2009 | Steinberg et al. |
| 7,551,800 B2 | 6/2009 | Corcoran et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,565,030 B2 | 7/2009 | Steinberg et al. |
| 7,574,016 B2 | 8/2009 | Steinberg et al. |
| 7,587,068 B1 | 9/2009 | Steinberg et al. |
| 7,587,085 B2 | 9/2009 | Steinberg et al. |
| 7,590,305 B2 | 9/2009 | Steinberg et al. |
| 7,599,577 B2 | 10/2009 | Ciuc et al. |
| 7,606,417 B2 | 10/2009 | Steinberg et al. |
| 7,616,233 B2 | 11/2009 | Steinberg et al. |
| 7,619,665 B1 | 11/2009 | DeLuca |
| 7,620,218 B2 | 11/2009 | Steinberg et al. |
| 7,630,006 B2 | 12/2009 | DeLuca et al. |
| 7,630,527 B2 | 12/2009 | Steinberg et al. |
| 7,634,109 B2 | 12/2009 | Steinberg et al. |
| 7,636,486 B2 | 12/2009 | Steinberg et al. |
| 7,639,888 B2 | 12/2009 | Steinberg et al. |
| 7,639,889 B2 | 12/2009 | Steinberg et al. |
| 7,660,478 B2 | 2/2010 | Steinberg et al. |
| 7,676,108 B2 | 3/2010 | Steinberg et al. |
| 7,676,110 B2 | 3/2010 | Steinberg et al. |
| 7,680,342 B2 | 3/2010 | Steinberg et al. |
| 7,683,946 B2 | 3/2010 | Steinberg et al. |
| 7,684,630 B2 | 3/2010 | Steinberg |
| 7,685,341 B2 | 3/2010 | Steinberg et al. |
| 7,689,009 B2 | 3/2010 | Corcoran et al. |
| 7,692,696 B2 | 4/2010 | Steinberg et al. |
| 7,693,311 B2 | 4/2010 | Steinberg et al. |
| 7,694,048 B2 | 4/2010 | Steinberg et al. |
| 7,697,778 B2 | 4/2010 | Steinberg et al. |
| 7,702,136 B2 | 4/2010 | Steinberg et al. |
| 7,702,236 B2 | 4/2010 | Steinberg et al. |
| 7,715,597 B2 | 5/2010 | Costache et al. |
| 7,738,015 B2 | 6/2010 | Steinberg et al. |
| 7,746,385 B2 | 6/2010 | Steinberg et al. |
| 7,747,596 B2 | 6/2010 | Bigioi et al. |
| 7,773,118 B2 | 8/2010 | Florea et al. |
| 7,787,022 B2 | 8/2010 | Steinberg et al. |
| 7,792,335 B2 | 9/2010 | Steinberg et al. |
| 7,792,970 B2 | 9/2010 | Bigioi et al. |
| 7,796,816 B2 | 9/2010 | Steinberg et al. |
| 7,796,822 B2 | 9/2010 | Steinberg et al. |
| 7,804,531 B2 | 9/2010 | DeLuca et al. |
| 7,804,983 B2 | 9/2010 | Steinberg et al. |
| 7,809,162 B2 | 10/2010 | Steinberg et al. |
| 7,822,234 B2 | 10/2010 | Steinberg et al. |
| 7,822,235 B2 | 10/2010 | Steinberg et al. |
| 7,844,076 B2 | 11/2010 | Corcoran et al. |
| 7,844,135 B2 | 11/2010 | Steinberg et al. |
| 7,847,839 B2 | 12/2010 | DeLuca et al. |
| 7,847,840 B2 | 12/2010 | DeLuca et al. |
| 7,848,549 B2 | 12/2010 | Steinberg et al. |
| 7,852,384 B2 | 12/2010 | DeLuca et al. |
| 7,853,043 B2 | 12/2010 | Steinberg et al. |
| 7,855,737 B2 | 12/2010 | Petrescu et al. |
| 7,860,274 B2 | 12/2010 | Steinberg et al. |
| 7,864,990 B2 | 1/2011 | Corcoran et al. |
| 7,865,036 B2 | 1/2011 | Ciuc et al. |
| 7,868,922 B2 | 1/2011 | Ciuc et al. |
| 7,869,628 B2 | 1/2011 | Corcoran et al. |
| 8,218,895 B1 | 7/2012 | Gleicher et al. |
| 2001/0031142 A1 | 10/2001 | Whiteside |
| 2002/0105662 A1 | 8/2002 | Patton et al. |
| 2002/0114535 A1 | 8/2002 | Luo |
| 2002/0145671 A1 | 10/2002 | Alon et al. |
| 2003/0052991 A1 | 3/2003 | Stavely et al. |
| 2005/0031224 A1 | 2/2005 | Prilutsky et al. |
| 2005/0107741 A1 | 5/2005 | Willard et al. |
| 2005/0140801 A1 | 6/2005 | Prilutsky et al. |
| 2005/0196068 A1 | 9/2005 | Kawai |
| 2006/0093238 A1 | 5/2006 | Steinberg et al. |
| 2006/0182437 A1 | 8/2006 | Williams et al. |
| 2006/0204034 A1 | 9/2006 | Steinberg et al. |
| 2006/0256226 A1 | 11/2006 | Alon et al. |
| 2006/0268130 A1 | 11/2006 | Williams et al. |
| 2007/0045991 A1 | 3/2007 | Perk |
| 2007/0147820 A1 | 6/2007 | Steinberg et al. |
| 2007/0160307 A1 | 7/2007 | Steinberg et al. |
| 2007/0236573 A1 | 10/2007 | Alon et al. |
| 2007/0236574 A1 | 10/2007 | Alon et al. |
| 2007/0239417 A1 | 10/2007 | Alon et al. |
| 2007/0253638 A1 | 11/2007 | Steinberg et al. |
| 2007/0269108 A1 | 11/2007 | Steinberg et al. |
| 2007/0296833 A1 | 12/2007 | Corcoran et al. |
| 2008/0002185 A1 | 1/2008 | Gitelson et al. |
| 2008/0008041 A1 | 1/2008 | Pettersen et al. |
| 2008/0009562 A1 | 1/2008 | Mitachi et al. |
| 2008/0013798 A1 | 1/2008 | Ionita et al. |
| 2008/0013799 A1 | 1/2008 | Steinberg et al. |
| 2008/0021989 A1 | 1/2008 | Carraher et al. |
| 2008/0028183 A1 | 1/2008 | Hwu et al. |
| 2008/0038325 A1 | 2/2008 | Nho et al. |
| 2008/0043121 A1 | 2/2008 | Prilutsky et al. |
| 2008/0045728 A1 | 2/2008 | Kruper, Jr. et al. |
| 2008/0049970 A1 | 2/2008 | Ciuc et al. |
| 2008/0075385 A1 | 3/2008 | David et al. |
| 2008/0075515 A1 | 3/2008 | Large |
| 2008/0095466 A1 | 4/2008 | Kinrot et al. |
| 2008/0112599 A1 | 5/2008 | Nanu et al. |
| 2008/0143854 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0218606 A1* | 9/2008 | Yoda .............................. 348/241 |
| 2008/0219517 A1 | 9/2008 | Blonk et al. |
| 2008/0219518 A1 | 9/2008 | Steinberg et al. |
| 2008/0219581 A1 | 9/2008 | Albu et al. |
| 2008/0220750 A1 | 9/2008 | Steinberg et al. |
| 2008/0232711 A1 | 9/2008 | Prilutsky et al. |
| 2008/0240555 A1 | 10/2008 | Nanu et al. |
| 2008/0266419 A1 | 10/2008 | Drimbarean et al. |
| 2008/0267461 A1 | 10/2008 | Ianculescu et al. |
| 2008/0292193 A1 | 11/2008 | Petronel Bigioi |
| 2008/0309769 A1 | 12/2008 | Albu et al. |
| 2008/0309770 A1 | 12/2008 | Florea et al. |
| 2008/0316317 A1 | 12/2008 | Weissman et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |

(56) References Cited

U.S. PATENT DOCUMENTS

| | | |
|---|---|---|
| 2008/0317379 A1 | 12/2008 | Steinberg et al. |
| 2009/0002514 A1 | 1/2009 | Steinberg et al. |
| 2009/0003661 A1 | 1/2009 | Ionita et al. |
| 2009/0003708 A1 | 1/2009 | Steinberg et al. |
| 2009/0021576 A1 | 1/2009 | Linder et al. |
| 2009/0022422 A1 | 1/2009 | Sorek et al. |
| 2009/0040342 A1 | 2/2009 | Drimbarean et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0115915 A1 | 5/2009 | Steinberg et al. |
| 2009/0123063 A1 | 5/2009 | Ciuc |
| 2009/0128666 A1 | 5/2009 | Rappaport et al. |
| 2009/0141163 A1 | 6/2009 | Attar et al. |
| 2009/0147111 A1 | 6/2009 | Litvinov et al. |
| 2009/0167893 A1 | 7/2009 | Susanu et al. |
| 2009/0179998 A1 | 7/2009 | Steinberg et al. |
| 2009/0179999 A1 | 7/2009 | Albu et al. |
| 2009/0185753 A1 | 7/2009 | Albu et al. |
| 2009/0189997 A1 | 7/2009 | Stec et al. |
| 2009/0189998 A1 | 7/2009 | Nanu et al. |
| 2009/0190238 A1 | 7/2009 | Alon et al. |
| 2009/0190803 A1 | 7/2009 | Neghina et al. |
| 2009/0196466 A1 | 8/2009 | Capata et al. |
| 2009/0238410 A1 | 9/2009 | Corcoran et al. |
| 2009/0238419 A1 | 9/2009 | Steinberg et al. |
| 2009/0263022 A1 | 10/2009 | Petrescu et al. |
| 2009/0303342 A1 | 12/2009 | Corcoran et al. |
| 2009/0303343 A1 | 12/2009 | Drimbarean et al. |
| 2009/0304278 A1 | 12/2009 | Steinberg et al. |
| 2010/0002071 A1* | 1/2010 | Ahiska ........................ 348/36 |
| 2010/0014721 A1 | 1/2010 | Steinberg et al. |
| 2010/0026831 A1 | 2/2010 | Ciuc et al. |
| 2010/0026832 A1 | 2/2010 | Ciuc et al. |
| 2010/0026833 A1 | 2/2010 | Ciuc et al. |
| 2010/0039520 A1 | 2/2010 | Nanu et al. |
| 2010/0039525 A1 | 2/2010 | Steinberg et al. |
| 2010/0053362 A1 | 3/2010 | Nanu et al. |
| 2010/0053367 A1 | 3/2010 | Nanu et al. |
| 2010/0053368 A1 | 3/2010 | Nanu et al. |
| 2010/0054533 A1 | 3/2010 | Steinberg et al. |
| 2010/0054549 A1 | 3/2010 | Steinberg et al. |
| 2010/0054592 A1 | 3/2010 | Nanu et al. |
| 2010/0060727 A1 | 3/2010 | Steinberg et al. |
| 2010/0066822 A1 | 3/2010 | Steinberg et al. |
| 2010/0141786 A1 | 6/2010 | Bigioi et al. |
| 2010/0141787 A1 | 6/2010 | Bigioi et al. |
| 2010/0141798 A1 | 6/2010 | Steinberg et al. |
| 2010/0146165 A1 | 6/2010 | Steinberg et al. |
| 2010/0165140 A1 | 7/2010 | Steinberg |
| 2010/0165150 A1 | 7/2010 | Steinberg et al. |
| 2010/0182458 A1 | 7/2010 | Steinberg et al. |
| 2010/0194895 A1 | 8/2010 | Steinberg et al. |
| 2010/0201826 A1 | 8/2010 | Steinberg et al. |
| 2010/0201827 A1 | 8/2010 | Steinberg et al. |
| 2010/0202707 A1 | 8/2010 | Costache et al. |
| 2010/0220899 A1 | 9/2010 | Steinberg et al. |
| 2010/0231727 A1 | 9/2010 | Steinberg et al. |
| 2010/0238309 A1 | 9/2010 | Florea et al. |
| 2010/0259622 A1 | 10/2010 | Steinberg et al. |
| 2010/0260414 A1 | 10/2010 | Ciuc |
| 2010/0271499 A1 | 10/2010 | Steinberg et al. |
| 2010/0272363 A1 | 10/2010 | Steinberg et al. |
| 2010/0295959 A1 | 11/2010 | Steinberg et al. |
| 2010/0303381 A1* | 12/2010 | Koehler et al. ............ 382/275 |
| 2010/0321537 A1 | 12/2010 | Zamfir et al. |
| 2010/0328472 A1 | 12/2010 | Steinberg et al. |
| 2010/0328486 A1 | 12/2010 | Steinberg et al. |
| 2010/0329549 A1 | 12/2010 | Steinberg et al. |
| 2010/0329582 A1 | 12/2010 | Albu et al. |
| 2011/0002506 A1 | 1/2011 | Ciuc et al. |
| 2011/0002545 A1 | 1/2011 | Steinberg et al. |
| 2011/0007174 A1 | 1/2011 | Bacivarov et al. |
| 2011/0013043 A1 | 1/2011 | Corcoran et al. |
| 2011/0013044 A1 | 1/2011 | Steinberg et al. |
| 2011/0025859 A1 | 2/2011 | Steinberg et al. |
| 2011/0025886 A1 | 2/2011 | Steinberg et al. |
| 2011/0026780 A1 | 2/2011 | Corcoran et al. |
| 2011/0033112 A1 | 2/2011 | Steinberg et al. |
| 2011/0043648 A1 | 2/2011 | Albu et al. |
| 2011/0050919 A1 | 3/2011 | Albu et al. |
| 2011/0050938 A1 | 3/2011 | Capata et al. |
| 2011/0053654 A1 | 3/2011 | Petrescu et al. |
| 2011/0055354 A1 | 3/2011 | Bigioi et al. |
| 2011/0063446 A1 | 3/2011 | McMordie et al. |
| 2011/0063465 A1 | 3/2011 | Nanu et al. |
| 2011/0081052 A1 | 4/2011 | Bigioi et al. |
| 2011/0234749 A1 | 9/2011 | Alon |

OTHER PUBLICATIONS

Co-pending U.S. Appl. No. 12/636,608.
Co-pending U.S. Appl. No. 12/636,618.
Co-pending U.S. Appl. No. 12/636,629.
Co-pending U.S. Appl. No. 12/636,639.
Co-pending U.S. Appl. No. 12/636,647.
Co-pending U.S. Appl. No. 12/825,280.
Co-pending U.S. Appl. No. 12/941,995.
Co-pending U.S. Appl. No. 12/959,281.
Co-pending U.S. Appl. No. 12/907,921.

* cited by examiner

SCENE ENHANCEMENTS IN OFF-CENTER PERIPHERAL REGIONS FOR NONLINEAR LENS GEOMETRIES

CROSS-REFERENCE AND RELATED APPLICATIONS

This application is related to U.S. patent application Ser. Nos. 12/959,089, 12/959,137 and 12/959,151, each filed Dec. 2, 2010, and this application is also related to U.S. patent application Ser. No. 13/077,936, filed Mar. 31, 2011.

BACKGROUND OF THE INVENTION

Image produced by the wide field of view lens vary in quality depending on the field angle. It is physical limitation of such lens.

Wide Field of View System

A WFOV, fish-eye or similar non-linear imaging system incorporates a lens assembly and a corresponding image sensor which is typically more elongated than a conventional image sensor. An indicative embodiment is provided in FIG. 1. The system may incorporate a face tracking module which employs one or more cascades of rectangular face classifiers.

Non-Linear Lens Geometries

An example expanded view of such a non-linear lens geometry is illustrated in FIG. 2. We note that some lens constructions can be modified to enhance the resolution of peripheral regions as described in U.S. Pat. No. 5,508,734 to Baker el al. However even with such modifications of the lens structure there is still a difference in resolution between the inner and outer regions of a non-linear lens when the imaged scene is projected onto the imaging sensor.

Taking a typical lens to sensor mapping of a rectangular grid will yield a pattern similar to FIG. 3. FIG. 3 illustrates distortion of a rectangular pattern caused by a typical non-linear (fish-eye) lens. Other patterns exist as illustrated in FIGS. 4(a)-4(i).

The radial distortion patterns are easier to manufacture and most lenses used in consumer imaging will exhibit one of the radial distortion patterns illustrated in FIGS. 3 and 4(a)-4(i). Image distortions may be corrected using various geometrical correction engines. These engines typically modify the pixels obtained at the sensor and transform them into a corrected rectangular grid. Such distortions may be corrected according to one particular application, which is to implement a variable electronic zoom by scaling the window of pixels used to reconstruct a rectangular image. FIG. 5 schematically illustrates two different windows used to build an ×1 and ×2.5 zoom image from the same set of underlying pixels data. Only the central pixels are used for the higher zoom 602a. FIG. 5 illustrates regions of an image sensor used to construct electronic zoom at ×1.0 (601a) and ×2.5 (602a) magnification.

Global Motion in Non-Linear Lens Geometries

Global motion can affect and induce errors in such an imaging system. This is illustrated in FIGS. 6 & 7(a)-7(b). US Patent application 2005/0196068 to Kawai details an improvement of such imaging systems to compensate for global motion and correct the geometrical corrections for camera motion during image acquisition. The imaging system of Kawai incorporates a vibration detecting subsystem but this could be replaced by various alternative motion detecting subsystems, including a frame-to-frame alignment engine operative solely on image data acquired in a video sequence. FIG. 6: Global motion (camera movement/handshake) lead to errors in geometrical correction; this will be more emphasized at higher focus factors. FIG. 7 illustrates motion vectors arising from global motion are more emphasized towards the center of a typical non-linear lens (RHS), whereas they are uniform across a conventional (linear) lens.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTIONS OF THE EMBODIMENTS

Within a digital image acquisition system comprising a non-linear, wide-angled lens and an imaging sensor, a method is provided for enhancing a scene containing one or more off-center peripheral regions, including acquiring an initial distorted image with a large field of view, including using a non-linear, wide-angled lens and imaging sensor. The method includes determining and extracting an off-center region of interest (hereinafter "ROI") within said image. Geometric correction is applied to reconstruct the off-center ROI into a rectangular or otherwise undistorted or less distorted frame of reference as a reconstructed ROI. A quality of reconstructed pixels within said reconstructed ROI is determined. Image analysis is selectively applied to the reconstructed ROI based on the quality of the reconstructed pixels.

The method may include compensating for global motion of the image acquisition system.

The method may also include repeating the method for a second distorted image, and generating a second reconstructed ROI of approximately a same portion of an image scene as the first reconstructed ROI. Responsive to analysis of the first and second reconstructed ROIs, both the first and second reconstructed ROIs may be processed to generate an enhanced output image of substantially the same portion of the image scene.

The method may include, based on the selectively applying image analysis, adjusting an image acquisition parameter and repeating the method for a second distorted image, and generating, based on the second distorted image, a second reconstructed ROI of approximately a same portion of an image scene as the first reconstructed ROI. The first and second reconstructed ROIs of approximately the same portion of the image scene may be processed to generate, based on the processing, an enhanced output image of substantially the same portion of the image scene.

Responsive to the analysis and the pixel quality, image enhancement may be selectively applied to generate an enhanced output image.

A digital image acquisition device is also provided including a non-linear, wide-angled lens and an imaging sensor configured to capture digital images of scenes containing one or more off-center peripheral regions, including an initial distorted image with a large field of view, a processor, and a memory having code embedded therein for programming the processor to perform any of the methods described herein.

One or more non-transitory, processor-readable storage media having code embedded therein for programming a processor to perform any of the methods described herein.

In certain embodiments, the idea is to vary type and amount of image correction depending on the location of the source image as well as depending on a final projection of an image that was created by projecting the source image (partially or whole) to a new coordinate system.

ROI Sub-Regions in Non-Linear Lens Geometries

Figure 8A:
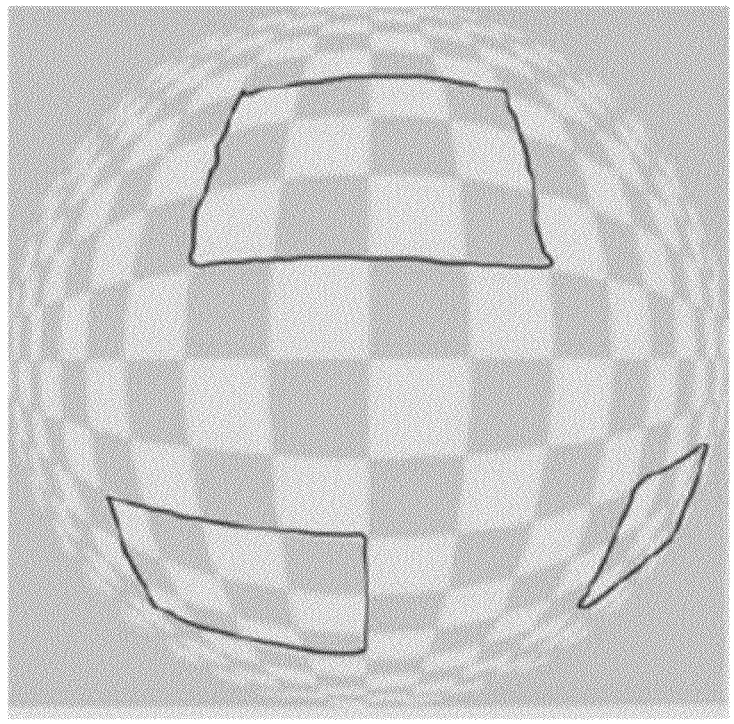
FIGS. 8(a) and 8(b) illustrate three different 4×3 ROIs within the FOV of the non-linear lens of (i) an exemplary fish-eye imaging system and (ii) an exemplary non-linear WFOV imaging system.
Figure 8B:
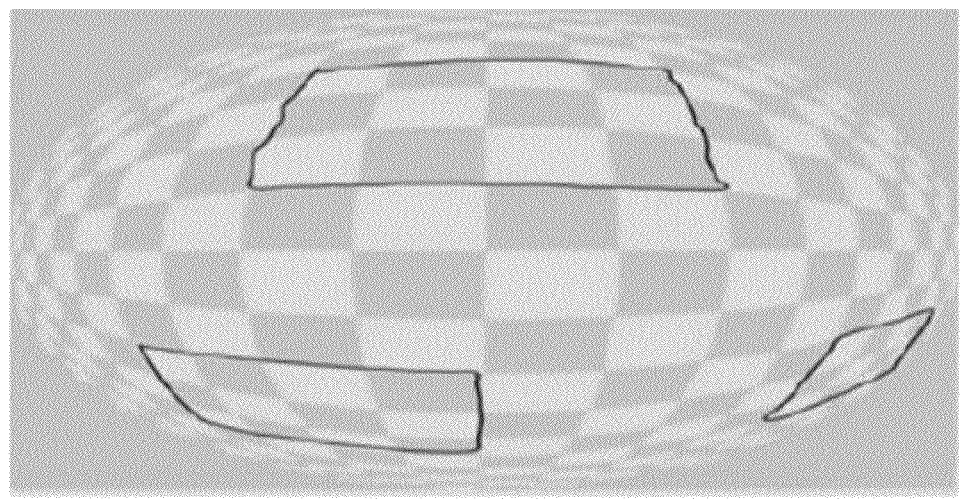

Now certain embodiments are configured to address a different problem, namely that of tracking faces in off-center portions of the imaged area based on a geometric correction engine and knowledge of one or more regions of interest (ROIs) within the overall field of view of the imaging system which contain or contains at least one face. An example of three different ROIs of similar 4×3 "real" dimensions is illustrated in FIGS. 8(a)-8(b). Considering that the underlying image sensor may be, for example, 3000×3000 pixels (9 Mpixel), then each of the regions illustrated in FIGS. 8(a)-8(b) would be typically resolved to either a VGA (640×480) or SVGA (800×600) pixel resolution. However, there will be a difficult non-linear mapping of the actual pixels which are useful to the final rectangular VGA, or SVGA image. While this mapping can be achieved using a geometric correction engine, given a knowledge of the location of the desired ROI, some pixels in the output VGA, or SVGA image frame may be reconstructed from better initial data than others.

In certain embodiments, it may be an effect of the geometric remapping of the image scene, or portions thereof, that the removal of purple fringes (due to blue shift) or the correction of chromatic aberrations may be desired. US published patent application no. US2009/0189997 is incorporated by reference as disclosing embodiments to detect and correct purple fringing and chromatic aberrations in digital images.

Figure 9:
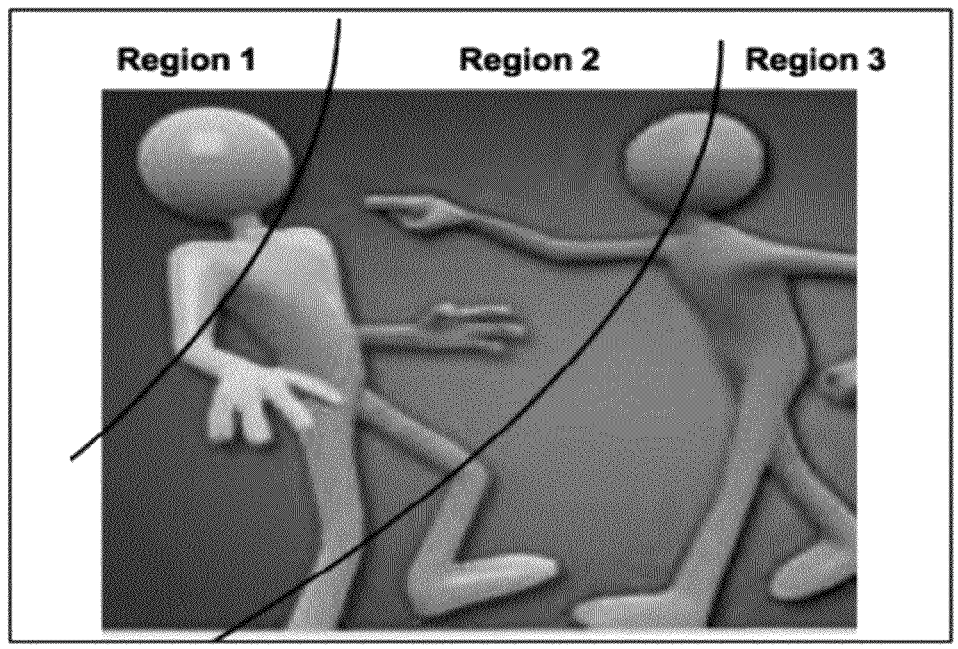
FIG. 9 illustrates an expanded image frame with different reconstructed image quality in the regions 1, 2, 3.

Referring now to FIG. 9, a reconstructed image with two persons included in the image scene is illustrated. Following the above discussion, different regions of this image will have different qualities of reconstructed pixels. In some cases the pixel values in a region are extrapolated based on a lower amount of data from the image sensor. As a generic measure, some pixels are described as having a reconstruction factor of greater than one. This implies that these pixels are reconstructed with at least the equivalent of more than one pixel of original data; while other pixels may have values less than unity implying that they are reconstructed from less than one pixel of original data.

Other factors may affect the quality of reconstruction. For example, regions with relatively homogeneous texture can be reconstructed with significantly less than 0.5 pixels of original data, whereas it may be desired for regions with substantial fine detail to use greater than 1.0 original pixel of equivalent data.

Figure 10:
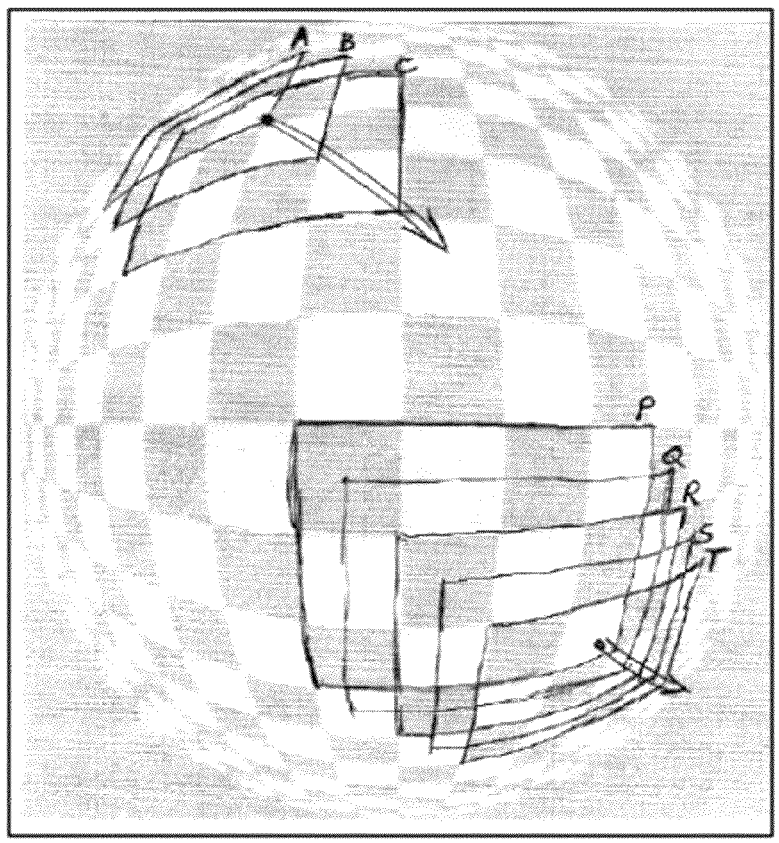
FIG. 10 Sequence of ROIs tracked across the imaging sensor acquired as a sequence of video frames.

In certain embodiments, a geometric reconstruction engine can provide information on the quality of areas of the image, or even at the level of individual pixels. In the example of FIG. 9, three regions are illustrated schematically. For the purposes of this illustrative, general example, these may be considered as representing pixels reconstructed with significantly more than 1.0 original pixels (Region 1, high quality—HQ); pixels reconstructed with the order of a single pixel (Region 2, normal quality—NQ) and pixels with significantly less than 1.0 original pixels (Region 3, reduced quality—RQ). In reconstructed images according to other embodiments, practically all pixels are HQ or NQ. However towards the periphery of the sensor, there may be a significant proportion of the reconstructed image which is of reduced quality. In the example of FIG. 9, two face regions are illustrated. One face belongs to a blue man that is entirely within a HQ region. The second face belonging to the yellow man has a face region separated into two regions: one lying in a region of normal pixel quality, and the second lying in a region of reduced quality. FIG. 10 illustrates a sequence of ROIs tracked across an imaging sensor acquired as a sequence of video frames.

Wide Field of View Optical System

As a wide field of view (WFOV) optical system may be configured to image a horizontal field of >90-100 degrees or more, it may be desired to process the scene captured by the system to present an apparently "normal" perspective on the scene. There are several approaches to this as exemplified by the example drawn from the architectural perspective of a long building described in Appendix A. In the context of our WFOV camera this disclosure is primarily directed at considering how facial regions will be distorted by the WFOV perspective of this camera. One can consider such facial regions to suffer similar distortions to the frontage of the building illustrated in this attached Appendix. Thus the problem to obtain geometrically consistent face regions across the entire horizontal range of the WFOV camera is substantially similar to the architectural problem described therein.

Thus, in order to obtain reasonable face regions, it is useful to alter/map the raw image obtained from the original WFOV horizontal scene so that faces appear undistorted. Or in alternative embodiments face classifiers may be altered according to the location of the face regions within an unprocessed (raw) image of the scene.

In a first preferred embodiment the center region of the image representing up to 100' of the horizontal field of view (FOV) is mapped using a squeezed rectilinear projection. In a first embodiment this may be obtained using a suitable non-linear lens design to directly project the center region of the scene onto the middle ⅔ of the image sensor. The remaining approximately ⅓ portion of the image sensor (i.e. ⅙ at each end of the sensor) has the horizontal scene projected using a cylindrical mapping. Again in a first preferred embodiment the edges of the wide-angle lens are designed to optically effect said projection directly onto the imaging sensor.

Figure 11A:
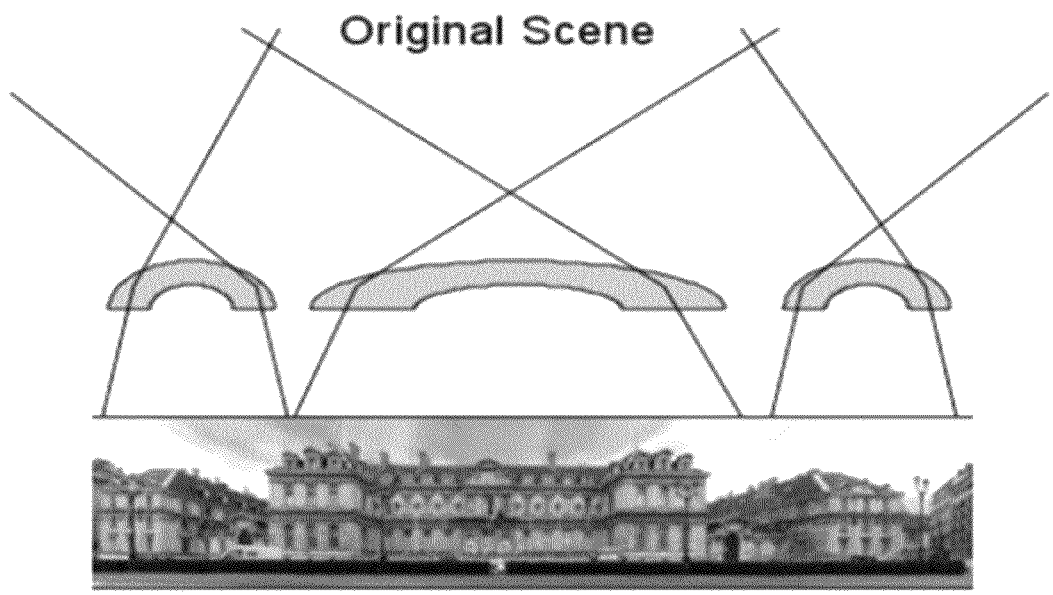
FIG. 11(a) illustrates a wide horizontal scene mapped onto a full extent of an image sensor.

Thus, in a first embodiment, the entire horizontal scene is mapped onto the full extent of the image sensor, as illustrated at FIG. 11(a).

Figure 11B:
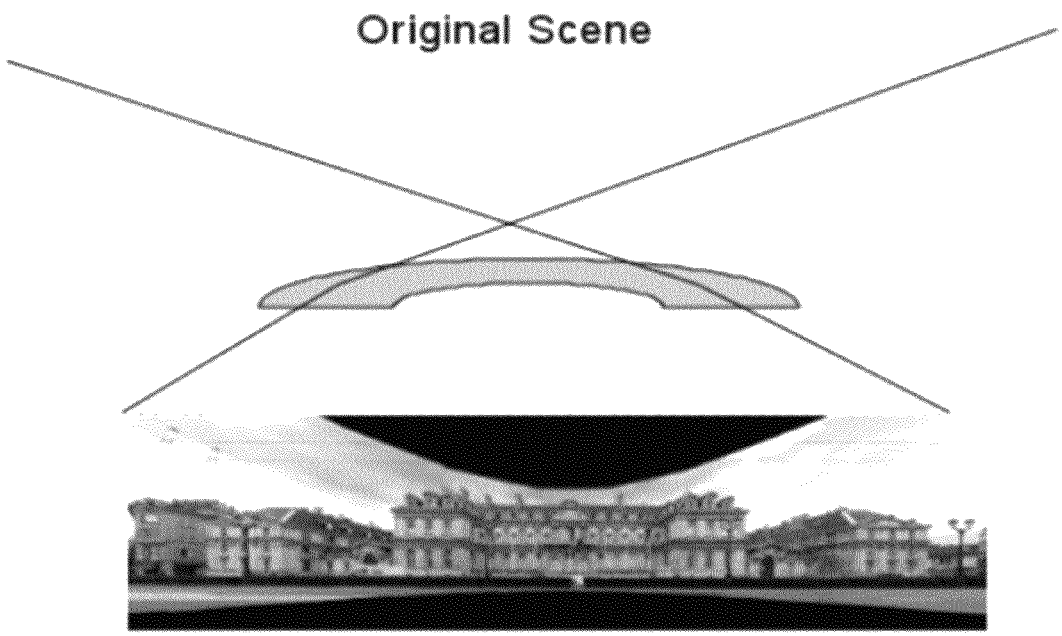
FIG. 11(b) illustrates a wide horizontal scene not mapped onto a full extent of an image sensor, and instead a significant portion of the sensor is not used.

Naturally the form and structure of such a complex hybrid optical lens may not be conducive to mass production thus in an alternative embodiment a more conventional rectilinear wide-angle lens is used and the squeezing of the middle 2/3 of the image is achieved by post-processing the sensor data. Similarly the cylindrical projections of the outer regions of the WFOV scene are performed by post processing. In this second embodiment the initial projection of the scene onto the sensor does not cover the full extent of the sensor and thus a significant portion of the sensor area does not contain useful data. The overall resolution of this second embodiment is reduced and a larger sensor would be used to achieve similar accuracy to the first embodiment, as illustrated at FIG. 11(b).

In a third embodiment some of the scene mappings are achieved optically, but some additional image post-processing is used to refine the initial projections of the image scene onto the sensor. In this embodiment the lens design can be optimized for manufacturing considerations, a larger portion of the sensor area can be used to capture useful scene data and the software post-processing overhead is similar to the pure software embodiment.

In a fourth embodiment multiple cameras are configured to cover overlapping portions of the desired field of view and the acquired images are combined into a single WFOV image in memory. These multiple cameras may be configured to have the same optical center, thus mitigating perspective related problems for foreground objects. In such an embodiment techniques employed in panorama imaging may be used advantageously to join images at their boundaries, or to determine the optimal join line where a significant region of image overlap is available. The following cases belong to the same assignee and relate to panorama imaging and are incorporated by reference: U.S. Ser. Nos. 12/636,608, 12/636,618, 12/636,629, 12/636,639, and 12/636,647, as are US published apps nos. US20060182437, US20090022422, US20090021576 and US20060268130.

In one preferred embodiment of the multi-camera WFOV device three, or more standard cameras with a 60 degree FOV are combined to provide an overall horizontal WFOV of 120-150 degrees with an overlap of 15-30 degrees between cameras. The field of view for such a cameras can be extended horizontally by adding more cameras; it may be extended vertically by adding an identical array of 3 or more horizontally aligned cameras facing in a higher (or lower) vertical direction and with a similar vertical overlap of 15-30 degrees offering a vertical FOV of 90-105 degrees for two such WFOV arrays. The vertical FOV may be increased by adding further horizontally aligned cameras arrays. Such configurations have the advantage that all individual cameras can be conventional wafer-level cameras (WLC) which can be mass-produced.

Figure 3:
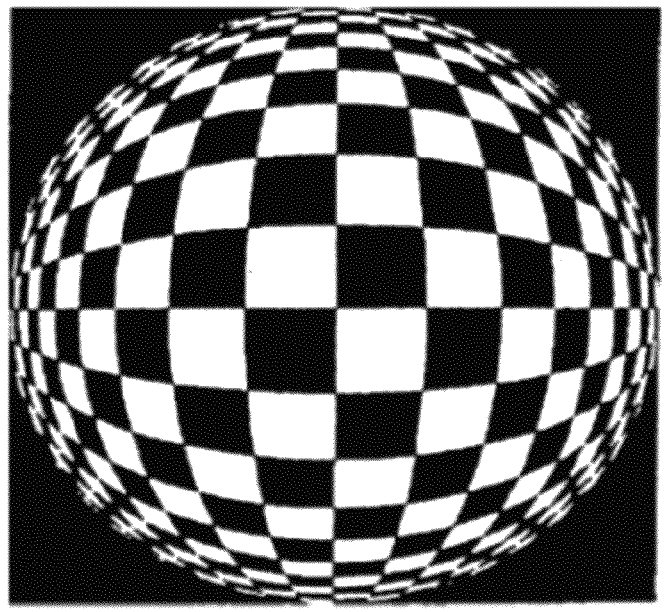
FIG. 3 illustrates distortion of a rectangular pattern caused by a typical non-linear (fish-eye) lens.
Figure 4A:
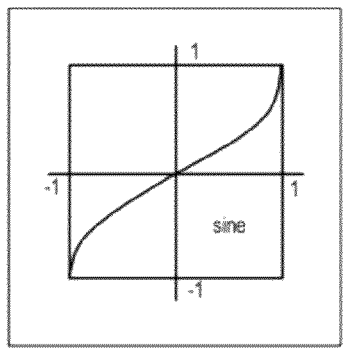
FIGS. 4(a)-4(i) illustrate various non-linear distortion patterns for a rectangular grid mapped onto an imaging sensor.
Figure 4B:
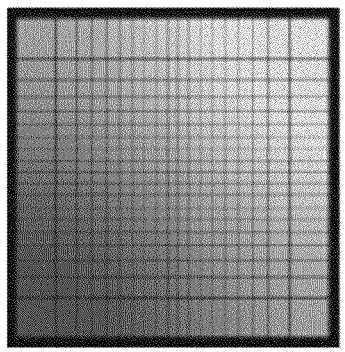
Figure 4C:
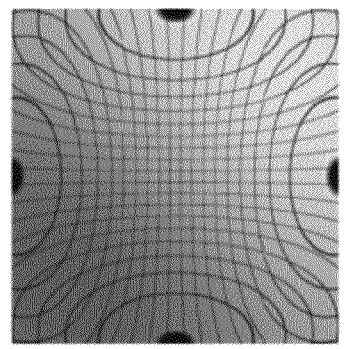
Figure 4D:
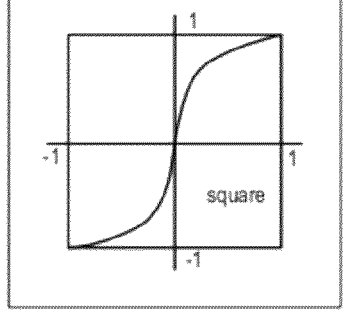
Figure 4E:
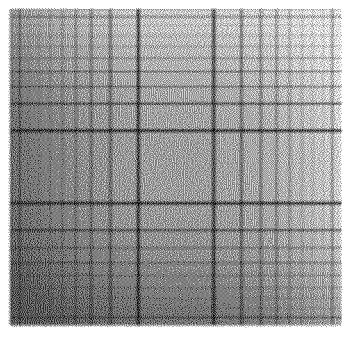
Figure 4F:
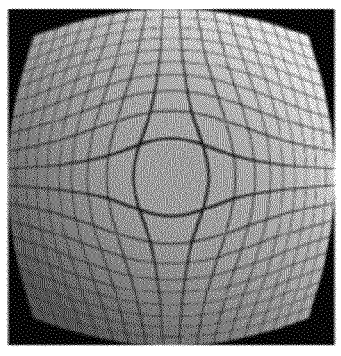
Figure 4G:
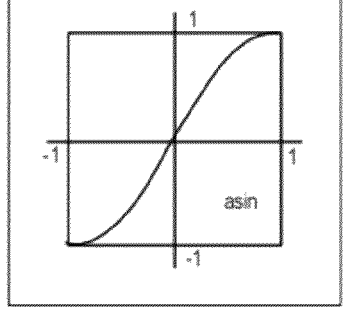
Figure 4H:
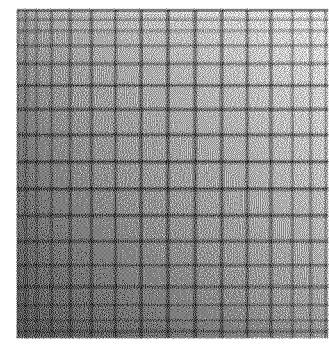
Figure 4I:
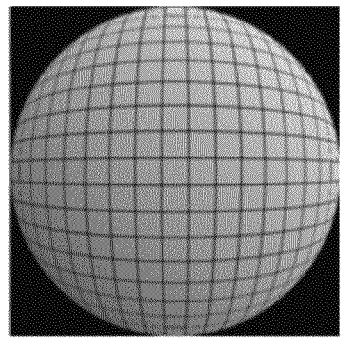
Figure 5:
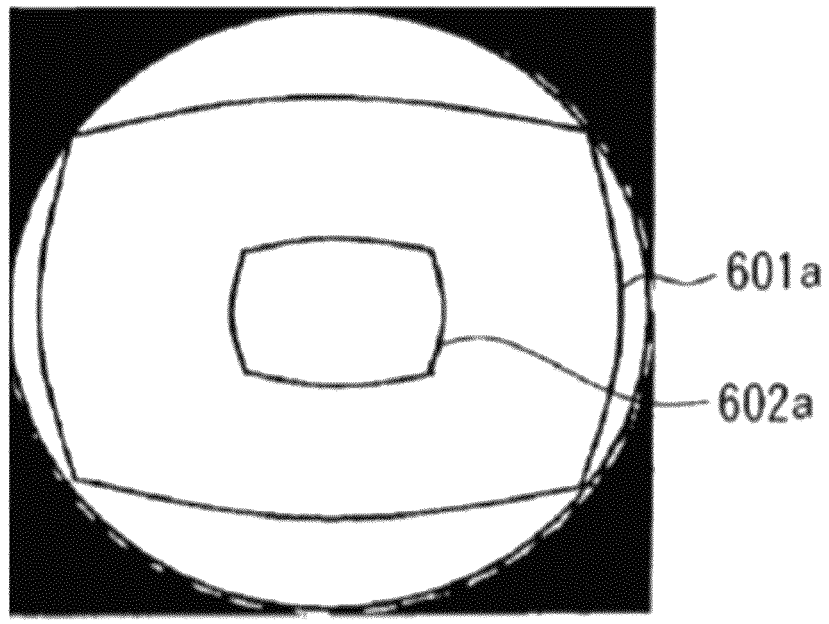
FIG. 5 illustrates regions of an image sensor used to construct electronic zoom at ×1.0 (601a) and ×2.5 (602a) magnification.
Figure 6:
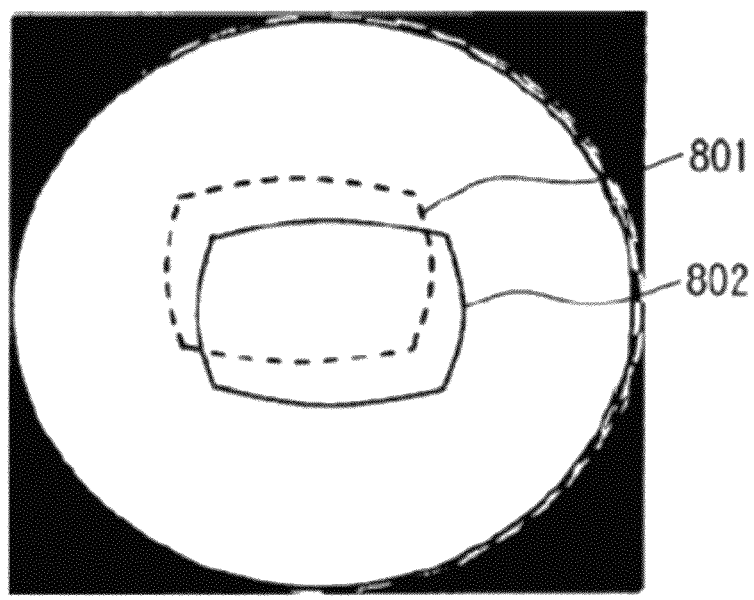
FIG. 6 illustrates global motion (camera movement/handshake) that tends to lead to errors in geometrical correction; this will be more emphasized at higher focus factors.
Figure 7A:
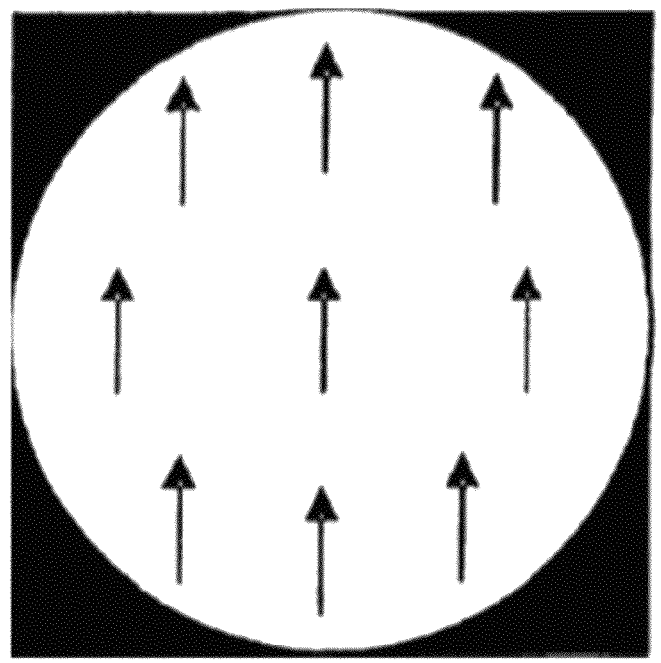
FIGS. 7(a) and 7(b) illustrate motion vectors arising from global motion are more emphasized towards the center of a typical non-linear lens (RHS), whereas they are uniform across a conventional (linear) lens.
Figure 7B:
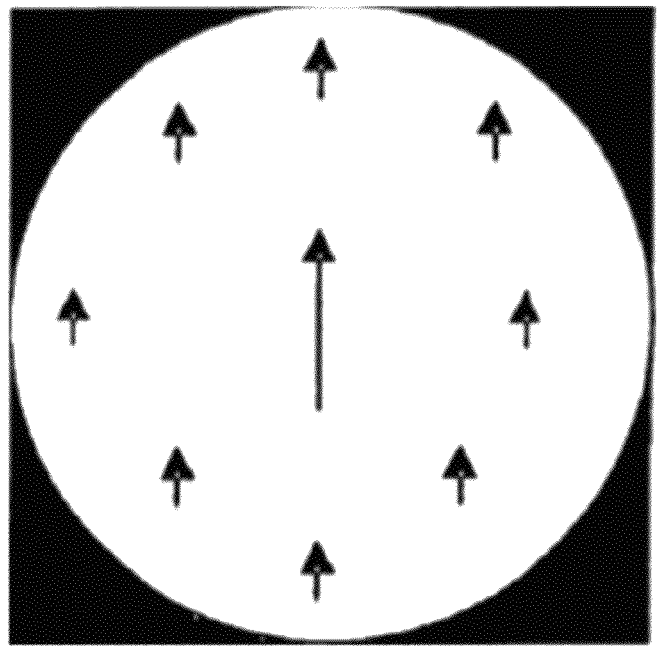

In an alternative multi-cameras embodiment a central WFOV cameras has its range extended by two side-cameras. The WFOV cameras can employ an optical lens optimized to provide a 120 degree compressed rectilinear mapping of the central scene. The side cameras can be optimized to provide a cylindrical mapping of the peripheral regions of the scene, thus providing a similar result to that obtained in FIG. 3(a), but using three independent cameras with independent optical systems rather than a single sensor/ISP as shown in FIG. 3(b). Again techniques employed in panorama imaging to join overlapping images can be advantageously used (see the Panorama cases referred to above herein).

After image acquisition and, depending on the embodiment, additional post-processing of the image, we arrive at a mapping of the image scene with three main regions. Over the middle third of the image there is a normal rectilinear mapping and the image is undistorted compared to a standard FOV image; over the next 1/3 of the image (i.e. 1/6 of image on either side) the rectilinear projection becomes increasingly squeezed as illustrated in FIGS. 1A-1G; finally, over the outer approximately 1/3 of the image a cylindrical projection, rather than rectilinear is applied.

FIG. 3(a) illustrates one embodiment where this can be achieved using a compressed rectilinear lens in the middle, surrounded by two cylindrical lenses on either side. In a practical embodiment all three lenses could be combined into a single lens structure designed to minimize distortions where the rectilinear projection of the original scene overlaps with the cylindrical projection.

A standard face-tracker can now be applied to the WFOV image as all face regions should be rendered in a relatively undistorted geometry.

In alternative embodiments the entire scene need not be re-mapped, but instead only the luminance components are re-mapped and used to generate a geometrically undistorted integral image. Face classifiers are then applied to this integral image in order to detect faces. Once faces are detected those faces and their surrounding peripheral regions can be re-mapped on each frame, whereas it may be sufficient to re-map the entire scene background, which is assumed to be static, only occasionally, say every 60-120 image frames. In this way image processing and enhancement can be focused on the people in the image scene.

In alternative embodiments it may not be desirable to completely re-map the entire WFOV scene due to the computational burden involved. In such embodiment, referring to U.S. Pat. Nos. 7,460,695, 7,403,643, 7,565,030, and 7,315,631 and US published app no. 2009-0263022, which are incorporated by reference along with US20090179998, US20090080713, US 2009-0303342 and U.S. Ser. No. 12/572,930, filed Oct. 2, 2009 by the same assignee. These references describe predicting face regions (determined from the previous several video frames). The images may be transformed using either cylindrical or squeezed rectilinear projection prior to applying a face tracker to the region. In such an embodiment, it may be involved from time to time to re-map a WFOV in order to make an initial determination of new faces within the WFOV image scene. However, after such initial determination only the region immediately surrounding each detected face need be re-mapped.

In certain embodiments, the remapping of the image scene, or portions thereof, involves the removal of purple fringes (due to blue shift) or the correction of chromatic aberrations. The following case belongs to the same assignee is incorporated by reference and relates to purple fringing and chromatic aberration correction: US20090189997.

In other embodiments a single mapping of the input image scene is used. If, for example, only a simple rectilinear mapping were applied across the entire image scene the edges of the image would be distorted and only across the middle 40% or so of the image can a conventional face tracker be used. Accordingly the rectangular classifiers of the face tracker are modified to take account of the scene mappings across the other 60% of image scene regions: Over the middle portion of the image they can be applied unaltered; over the second 30% they are selectively expanded or compressed in the horizontal direction to account for the degree of squeezing of the scene during the rectilinear mapping process. Finally, in the outer ⅓ the face classifiers are adapted to account for the cylindrical mapping used in this region of the image scene.

In order to transform standard rectangular classifiers of a particular size, say 32×32 pixels, it may be advantageous in some embodiments to increase the size of face classifiers to, for example, 64×64. This larger size of classifier would enable greater granularity, and thus improved accuracy in transforming normal classifiers to distorted ones. This comes at the expense of additional computational burden for the face tracker. However we note that face tracking technology is quite broadly adopted across the industry and is known as a robust and well optimized technology. Thus the trade off of increasing classifiers from 32×32 to 64×64 for such faces should not cause a significant delay on most camera or smartphone platforms. The advantage is that pre-existing classifier cascades can be re-used, rather than having to train new, distorted ones.

Having greater granularity for the classifiers is advantageous particularly when starting to rescale features inside the classifier individually, based on the distance to the optical center. In another embodiment, one can scale the whole 22×22 (this is a very good size for face classifiers) classifier with fixed dx,dy (computed as distance from the optical center). Having larger classifiers does not put excessive strain on the processing. Advantageously, it is opposite to that, because there are fewer scales to cover. In this case, the distance to subject is reduced.

Figure 1:
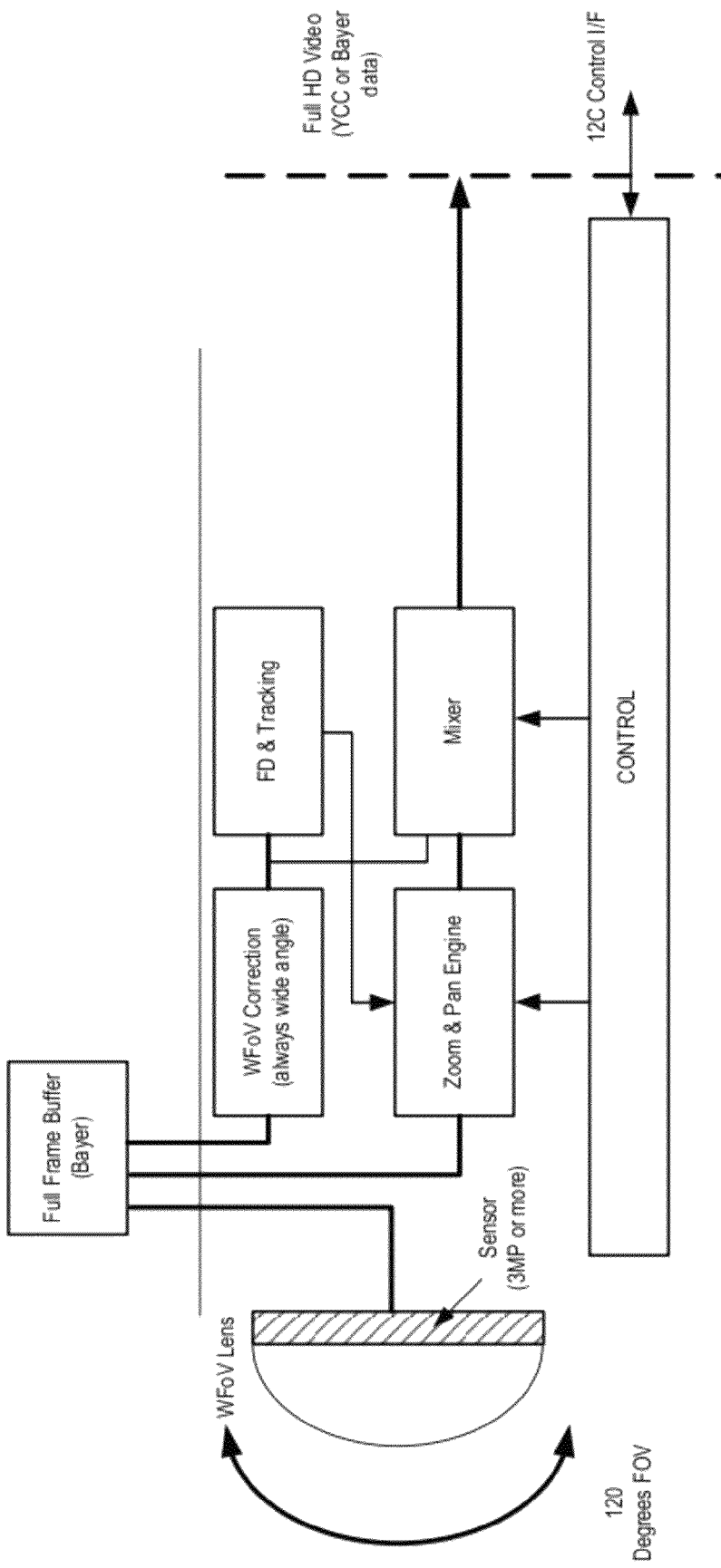
FIG. 1 illustrates a wide field of view (WFOV) system incorporating face-tracker.
Figure 2:
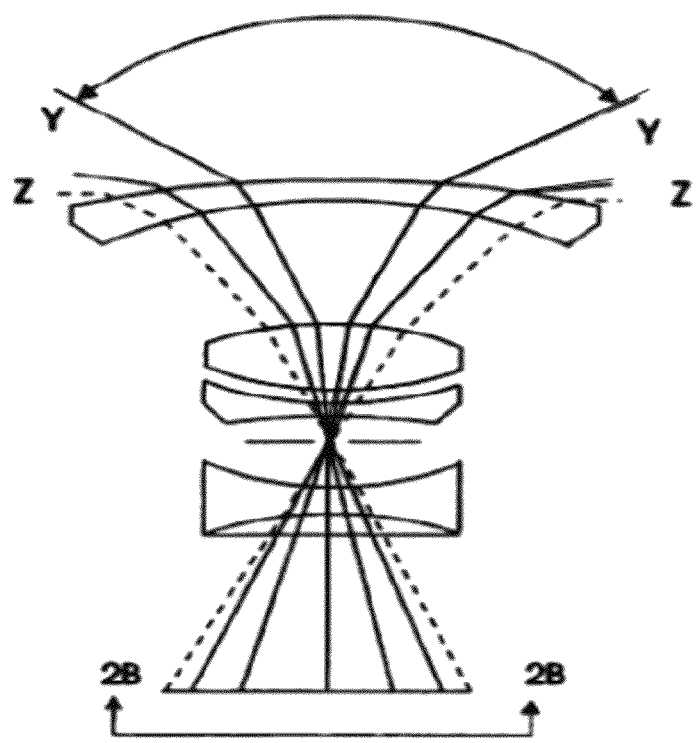
FIG. 2 illustrates an exploded diagram of a non-linear lens.

In an alternative embodiment an initial, shortened chain of modified classifiers is applied to the raw image (i.e. without any rectilinear or cylindrical re-mapping). This chain is composed of some of the initial face classifiers from a normal face detection chain. These initial classifiers are also, typically, the most aggressive to eliminate non-faces from consideration. These also tend to be simpler in form and the first four Haar classifiers from the Viola-Jones cascade are illustrated in FIG. 4 (these may be implemented through a 22×22 pixel window in another embodiment).

Where a compressed rectilinear scaling would have been employed (as illustrated in FIG. 1F, it is relatively straightforward to invert this scaling and expand (or contract) these classifiers in the horizontal direction to compensate for the distortion of faces in the raw image scene. (In some embodiments where this distortion is cylindrical towards the edges of the scene then classifiers may need to be scaled both in horizontal and vertical directions). Further, it is possible from a knowledge of the location at which each classifier is to be applied and, optionally, the size of the detection window, to perform the scaling of these classifiers dynamically. Thus only the original classifiers have to be stored together with data on the required rectilinear compression factor in the horizontal direction. The latter can easily be achieved using a look-up table (LUT) which is specific to the lens used.

This short classifier chain is employed to obtain a set of potential face regions which may then be re-mapped (using, for example, compressed rectilinear compression and/or cylindrical mapping) to enable the remainder of a complete face detection classifier chain to be applied to each potential face region. This embodiment relies on the fact that 99.99% of non-face regions are eliminated by applying the first few face classifiers; thus a small number of potential face regions would be re-mapped rather than the entire image scene before applying a full face detection process.

In another embodiment, distortion may be compensated by a method that involves applying geometrical adjustments (function of distance to optical center) when an integral image is computed (in the cases where the template matching is done using II) or compensate for the distortion when computing the sub-sampled image used for face detection and face tracking (in the cases where template matching is done directly on Y data).

Note that face classifiers can be divided into symmetric and non-symmetric classifiers. In certain embodiments it may be advantageous to use split classifier chains. For example right and left-hand face detector cascades may report detection of a half-face region—this may indicate that a full face is present but the second half is more or less distorted than would be expected, perhaps because it is closer to or farther from the lens than is normal. In such cases a more relaxed half, or full-face detector may be employed to confirm if a full face is actually present or a lower acceptance threshold may be set for the current detector. The following related apps belong to the same assignee are incorporated by reference: US2007/0147820, US2010/0053368, US2008/0205712, US2009/0185753, US2008/0219517 and 2010/0054592, and U.S. Ser. No. 61/182,625, filed May 29, 2009 and U.S. Ser. No. 61/221,455, filed Jun. 29, 2009.

Scene Enhancements

In certain embodiments, a first image of a scene is reconstructed from sensor data. This first image is then analyzed using a variety of image analysis techniques and at least a second set of main image data is acquired and used to reconstruct at least a second image of substantially the same scene. The second image is then analyzed and the results of these at least two analyses are used to create an enhanced image of the original scene. Examples of various image analysis techniques include: (i) foreground/background separation; (ii) face detection and facial feature detection including partial or occluded faces or features and peripheral face regions; (iii) indoor/outdoor image classification; (iv) global luminance analysis; (v) local luminance analysis; (vi) directional luminance analysis; (vii) image blur analysis—global and local; (viii) image gradient analysis; (ix) color filtering & segmentation including color correlogram analysis; (x) image variance analysis; (xi) image texture filtering & segmentation. (incorporate various FN patents according to each category).

The following belong to the same assignee as the present application and are incorporated by reference, particularly as describing alternative embodiments:

US published patent applications nos.:
20110053654, 20110013044, 20110025886, 20110013043, 20110002545, 20100328486, 20110025859, 20100329549, 20110033112, 20110002506, 20110055354, 20100260414, 20110050919, 20110043648, 20100329582, 20110026780, 20100238309, 20110007174, 20100202707, 20100328472, 20100194895, 20100182458, 20100165140, 20100146165, 20100321537, 20100141798, 20100295959, 20100201826, 20100259622, 20100201827, 20100220899, 20100141787, 20100141786, 20100165150, 20100060727, 20100271499, 20100039525, 20100231727, 20100066822, 20100053368, 20100053367, 20100053362, 20100054592, 20090304278, 20100026833, 20100026832, 20100026831, 20100014721, 20090303343, 20090303342, 20090238419, 20090238410, 20100272363, 20090189998, 20090189997, 20090190803, 20090179999, 20090167893, 20090179998, 20090040342, 20090002514, 20090003661, 20100054549, 20100054533, 20100039520, 20080267461, 20080317379, 20080317339, 20090003708, 20080316328, 20080316327, 20080317357, 20080317378, 20080309769, 20090185753, 20080266419, 20090263022, 20080219518, 20080232711, 20080220750, 20080219517, 20080205712, 20080186389, 20090196466, 20080143854, 20090123063, 20080112599, 20090080713, 20090080797, 20090080796, 20080219581, 20080049970, 20080075385, 20090115915, 20080043121, 20080013799, 20080309770, 20080013798, 20070296833, 20080292193, 20070269108, 20070253638, 20070160307, 20080175481, 20080240555, 20060093238, 20050140801, 20050031224, and 20060204034; and U.S. Pat. Nos. 7,536,061, 7,683,946, 7,536,060, 7,746,385, 7,804,531, 7,847,840, 7,847,839, 7,697,778, 7,676,108, 7,620,218, 7,860,274, 7,848,549, 7,634,109, 7,809,162, 7,545,995, 7,855,737, 7,844,135, 7,864,990, 7,684,630, 7,869,628, 7,787,022, 7,822,235, 7,822,234, 7,796,816, 7,865,036, 7,796,822, 7,853,043, 7,551,800, 7,515,740, 7,466,866, 7,693,311, 7,702,136, 7,474,341, 7,460,695, 7,630,527, 7,469,055, 7,460,694, 7,403,643, 7,773,118, 7,852,384, 7,702,236, 7,336,821, 7,295,233, 7,469,071, 7,868,922, 7,660,478, 7,844,076, 7,315,631, 7,551,754, 7,804,983, 7,792,335, 7,680,342, 7,619,665, 7,692,696, 7,792,970, 7,599,577, 7,689,009, 7,587,085, 7,606,417, 7,747,596, 7,506,057, 7,685,341, 7,436,998, 7,694,048, 7,715,597, 7,565,030, 7,639,889, 7,636,486, 7,639,888, 7,536,036, 7,738,015, 7,590,305, 7,352,394, 7,551,755, 7,558,408, 7,587,068, 7,555,148, 7,564,994, 7,424,170, 7,340,109, 7,308,156, 7,310,450, 7,206,461, 7,369,712, 7,676,110, 7,315,658, 7,630,006, 7,362,368, 7,616,233, 7,315,630, 7,269,292, 7,471,846, 7,574,016, 7,440,593, 7,317,815, 7,042,505, 6,035,072, and 6,407,777.

An output image may be enhanced in a number of different ways. Many of these enhancements may be combined and may be executed in parallel using specialized image processing hardware (see, e.g., U.S. Pat. No. 7,787,022, and U.S. patent application Ser. Nos. 12/959,281, 12/907,921, 12/941, 995 and 61/406,970, which are incorporated by reference).

A broad range of techniques may be employed in image manipulation and/or image enhancement in accordance with preferred and alternative embodiments, may involve automatic, semi-automatic and/or manual operations, and are applicable to several fields of application. Some of the discussion that follows has been grouped into subcategories for ease of discussion, including (i) Contrast Normalization and Image Sharpening; (ii) Image Crop, Zoom and Rotate; (iii) Image Color Adjustment and Tone Scaling; (iv) Exposure Adjustment and Digital Fill Flash applied to a Digital Image; (v) Brightness Adjustment with Color Space Matching; and Auto-Gamma determination with Image Enhancement; (vi) Input/Output device characterizations to determine Automatic/Batch Image Enhancements; (vii) In-Camera Image Enhancement; and (viii) Face Based Image Enhancement.

(i) Contrast Normalization and Image Sharpening

This field is relates to adjusting a digital image, after capture, to improve the image sharpness, contrast and/or potentially simulate an improved focus on the main subject. An image may be sharpened by transforming the image representation into a frequency-domain representation and by selectively applying scaling factors to certain frequency domain characteristics of an image (see, e.g., U.S. Pat. No. 6,421,468 to Ratnakar et al., incorporated by reference). The modified frequency domain representation may be back-transformed into the spatial domain and provide a sharpened version of the original image. This image sharpening effect may be applied to the entire image (see particularly Ratnakar et al., above). Image sharpening may also be applied selectively to particular spatial regions within an image in accordance with an embodiment herein.

Automatic contrast enhancement of an image may be provided by increasing the dynamic range of the tone levels within an image without causing substantial distortion or shifts to the color map of the image (see, e.g., U.S. Pat. No. 6,393,148 to Bhaskar, incorporated by reference). This enhancement may be applied to the entire image or selectively and advantageously to a one or more particular spatial regions within the image. In addition, correction for the entire image may be selectively derived from characteristics of a particular spatial region within the image, such as a human face region.

A digital photo-finishing system may include image processing to provide scene balance, image sharpening and/or contrast normalization (see, e.g., U.S. Pat. No. 6,097,470 to Buhr et al., incorporated by reference). Algorithms may be optimized to a print medium and applied to the entire image.

(ii) Crop, Zoom and Rotate a Digital Image

The selection of a portion of a digital image with an improved compositional form over the original image represents a form of image enhancement by "cropping". A similar technique involves selecting a sub-region of the original image and enhancing the resolution of this sub-region by interpolating between the pixels. This represents a form of digital zooming of the image and can provide an improvement on the original image if correctly applied. A third means of spatially altering the image is to change the image orientation by rotating the image. This may be, e.g., a straightforward 90° or 270° rotation to change the image aspect from landscape to portrait or vice-versa, or may involve a rotation of an arbitrary number of degrees, e.g., to level the eye line, etc. (see also above).

An electrical system, software or firmware may be provided wherein an image of a portion of a photographic image is automatically produced. This may utilize a technique known as a "belief map" (see, e.g., US patent application 2002/0114535 to Luo, incorporated by reference) to determine the probability that a certain region within the principle image is the main region of interest. Main subjects may be automatically determined in an image (see, e.g., U.S. Pat. No. 6,282,317 to Luo et al., incorporated by reference). Regions of arbitrary shape and/or size may be extracted from a digital image. These regions may be grouped into larger segments corresponding to physically coherent objects. A probabilistic reasoning engine for main-subject-detection may also estimate the region which is most likely to be the main subject of the image. This technique may involve a set of feature extractions from the original image which are then filtered through a tunable, extensible, probability network to generate the belief map. In this alternative embodiment, the probabilistic "belief map" is generated by the main subject detection engine.

The above system of the alternative embodiment involving the generation of a belief map may generally involve some degree of computational complexity. According to a preferred embodiment herein, information gained from the detection and/or presence of faces in an image may be advantageously used to determine a region or regions of interest within an image, generally involving a reduction of computational complexity and making its application with resource-constrained portable or embedded systems very desirable.

A system, software and/or firmware may be provided that automatically rotates, crops and scales digital images for printing (see, e.g., U.S. Pat. No. 6,456,732 to Kimbell et al., incorporated by reference). In this embodiment, an optimal number of digital images may be fit onto a sheet of paper of definite size in a printer. The system may or may not involve improving the images themselves, and/or may include one or more components that serve to preserve the original image quality in the printed form. In accordance with a preferred embodiment, the actions of rotating, cropping and/or scaling an image may be based on criteria other than those derived from the image as a whole, such as information pertaining to faces in the image.

An embodiment involving automatic image cropping may use regional intensity variations to separate areas of an image with uniform intensity levels from those with significant variation in intensity levels (see, e.g., U.S. Pat. No. 5,978,519 to Bollman et al., incorporated by reference). A portrait, e.g., may be cropped from a uniform background, such as in the instance of a passport photograph. In accordance with a preferred embodiment, however, a portrait may be extracted from a more complex background. Automatic cropping may be based on intensity and/or texture variances of regions within an image. Face detection is preferably used as an advantageous means to determine a region within an image for automatic cropping.

In the context of automatic image rotation, and determining image orientation, an embodiment including electrical, software and/or firmware components that detect blue sky within images may be included (see, e.g., U.S. Pat. No. 6,504,951 to Luo et al., incorporated by reference) This feature allows image orientation to be determined once the blue-sky region(s) are located and analyzed in an image. In accordance with an alternative embodiment, other image aspects are also used in combination with blue sky detection and analysis, and in particular the existence of facial regions in the image, to determine the correct orientation of an image.

(iii) Color Adjustment and Tone Scaling of a Digital Image

A portion of an image may be modified in accordance with colorimetric parameters (see, e.g., US published patent application 2002/0105662 to Patton et al., incorporated by reference). Such image modification may involve identifying a region representing skin tone in an image, displaying a plurality of renderings for the skin tone, selecting one of the renderings and/or modifying the skin tone regions in the images in accordance with the rendering of the skin tone, e.g., as selected by the user or automatically or semi-automatically selected using software and/or firmware. The skin tone information from a particular region of the image may be used to enhance the image. In accordance with a preferred embodiment, facial regions are detected within the image, based on which image enhancement is automatically or semi-automatically performed.

In another embodiment, image color may be compensated when adjusting the contrast of a digital color image (see, e.g., U.S. Pat. No. 6,438,264 to Gallagher et al., incorporated by reference). This may include receiving a tone scale function, calculating a local slope of the tone scale function for each pixel of a digital image, calculating a color saturation signal from the digital color image, and/or adjusting the color saturation signal for each pixel of the color image based on the local tone scale slope. Image enhancements may be applied to the entire image and/or may be based on a global tone scale function. In accordance with the preferred embodiment, such enhancement may be applied to a region of interest such as a facial region. Characteristics of a region of the image may be used to apply automatic enhancements to the entire image or, alternatively, the use of whole image characteristics or global characteristic functions may be used to apply automatic enhancements to selective regions of an image, such as facial regions.

A spatially blurred and/or sub-sampled version of an original image can be used to obtain information regarding statistical characteristics of a scene or original image (see, e.g., U.S. Pat. No. 6,249,315 to Holm, incorporated by reference). This information may be combined with tone reproduction curves and other characteristics of an output device or media to provide an enhancement strategy for optimized output of a digital image. This processing can be performed automatically or by simple, intuitive manual adjustment by a user.

(iv) Exposure Adjustment and Digital Fill Flash

A system, software, firmware or method for simulating fill flash in digital photography may be provided in accordance with preferred and alternative embodiments herein (see also US patent application 2003/0052991 to Stavely et al., incorporated by reference) A digital camera may be used to shoot a series of photographs of a scene at various focal distances. These pictures may be subsequently analyzed to determine distances to different objects in the scene. Regions of these pictures may have their brightness selectively adjusted based on the aforementioned distance calculations and may be then combined to form a single, photographic image. In accordance with a preferred embodiment, information regarding the existence of facial regions within the image is used, e.g., to particularly selectively adjust the brightness of the facial regions. Moreover, automatic enhancement on a single image may be advantageously performed in the preferred embodiment. Performing such enhancement on a single image reduces the speed which a camera may otherwise be limited to capturing multiple images with. Alternatively, several images may be combined to form one. A multiplicity of images may be captured in this alternative embodiment by a digital camera without the camera moving, generally involving a camera employing a very fast image capture process.

Another embodiment includes scene recognition method and a system using brightness and ranging mapping (see, e.g., US published patent application 2001/0031142 to Whiteside, incorporated by reference). Auto-ranging and/or brightness measurement may be used to adjust image exposure to ensure that background and/or foreground objects are correctly illuminated in a digital image. Automatically adjustment of image exposure may be performed prior to image capture, or more preferably after the image is captured.

In the preferred embodiment, corrections and enhancements of regions within digital images are performed preferably including entire faces or parts of faces that themselves form part of an overall image. This may include a selected face or selected faces of multiple faces appearing in an image. For these preferred corrections and enhancements, fill flash is preferably used. Alternatively, image correction and enhancements may be performed on entire digital images. This may involve correction of image exposure and tone scale (see, e.g., U.S. Pat. No. 6,473,199 to Gilman et al. and U.S. Pat. No. 5,991,456 to Rahman et al., incorporated by reference).

Regional analysis and regional adjustment of image intensity or exposure levels may be performed in accordance with preferred and alternative embodiments. A method or apparatus may use area selective exposure adjustment (see, e.g., U.S. Pat. No. 5,818,975 to Goodwin et al., incorporated by reference). A digital image can have the dynamic range of its scene brightness reduced to suit the available dynamic brightness range of an output device by separating the scene into two regions: one with a high brightness range and one with a low brightness range. A brightness transform may be derived for both regions to reduce the brightness of the first region and to boost the brightness of the second region, recombining both regions to reform an enhanced version of the original image for an output device.

In another embodiment, brightness adjustment of images uses digital scene analysis (see, e.g., U.S. Pat. No. 5,724,456 to Boyack et al.). An image may be partitioned into blocks and larger groups of blocks that may be referred to as sectors. An average luminance block value may be determined. A difference may be determined between the maximum and minimum block values for one or more sectors. If this difference exceeds a pre-determined threshold, the sector may be marked active. A histogram of weighted counts of active sectors against average luminance sector values may also be plotted and the histogram shifted to using a pre-determined criteria so that the average luminance sector values of interest will fall within a destination window corresponding to a tonal reproduction capability of a destination application or output device. In accordance with a preferred embodiment, regions within an image are preferably used, and even more preferably the presence or knowledge of a human facial region or facial regions within the image are used to determine and/or apply image enhancement and/or correction to the regions or to the image as whole.

(v) Brightness Adjustment; Color Space Matching; Auto-Gamma

Further preferred and alternative embodiments involving face detection and image enhancement may include brightness adjustment and color matching between color spaces. For example, image data may be transformed from device dependent color spaces to device-independent lab color spaces and back again (see, e.g., U.S. Pat. No. 6,459,436 to Kumada et al., incorporated by reference). Image data may be initially captured in a color space representation which is dependent on the input device, and may be subsequently converted into a device independent color space. Gamut mapping (hue restoration) may be performed in the device independent color space and the image data may then be mapped back to a second device-dependent color space and sent to an output device.

A system, software and/or firmware may be provided to correct luminance and chrominance data in digital color images (see, e.g., U.S. Pat. No. 6,268,939 to Klassen et al., incorporated by reference) In this embodiment, transformations may be optimized between device dependent and device independent color spaces by applying sub-sampling of the luminance and chrominance data. In another embodiment, quality improvement of a printed image may be performed by automatically determining an image gamma and then adjusting the gamma of a printer to correspond to that of the image (see, e.g., U.S. Pat. No. 6,192,149 to Eschback et al., incorporated by reference). The printed quality of a digital image may be thereby enhanced, and preferably a digital image itself may also be enhanced in this way. In an alternative embodiment, software or firmware provides for automatically determining the gamma of a digital image. This information may be advantageously used to directly adjust image gamma, or used as a basis for applying other enhancements to the original digital image, such as face detection-based image enhancement according to a preferred embodiment. In addition, a gradation correction to an RGB image signal may be implemented allowing image brightness to be adjusted without affecting image hue and saturation (see, e.g., U.S. Pat. No. 6,101,271 to Yamashita et al., incorporated by reference)

Embodiments have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

What is claimed is:

1. Within a digital image acquisition apparatus comprising a non-linear, wide-angled lens and an imaging sensor, a method of enhancing a scene containing one or more off-center peripheral regions, the method comprising:
using a processor;
acquiring an initial distorted image with a large field of view, including using a non-linear, wide-angled lens and an imaging sensor;
extracting one or more distorted regions within said initial distorted image in accordance with known distortion characteristics of a configuration of the non-linear, wide-angled lens and the imaging sensor;

applying a geometric correction to reconstruct said one or more distorted regions into an approximately rectangular frame of reference as one or more respectively reconstructed regions within said large field of view and corresponding to one or more off-center reconstructed regions of a scene captured as said initial distorted image, said one or more off-center reconstructed regions having been imaged through a different region of the non-linear, wide angled lens than a center region, and said one or more off-center reconstructed regions having been captured as one or more groups of pixels at one or more different regions of said same imaging sensor that has also captured a non-distorted or less-distorted center region within said large field of view;

determining a quality of reconstructed pixels, relative to pixels of the initial distorted image, within said one or more reconstructed regions; and selectively applying image analysis to said one or more reconstructed regions based on the quality of the reconstructed pixels.

2. A method as in claim 1, further comprising compensating for global motion of the digital-image acquisition apparatus.

3. A method as in claim 1, further comprising repeating the method for a second distorted image, and generating a second set of one or more reconstructed regions of approximately one or more respectively same regions of said scene as the first set of one or more reconstructed regions.

4. A method as in claim 3, further comprising, responsive to analysis of the first and second sets of one or more reconstructed regions, processing both the first and second sets of one or more reconstructed regions and generating, based on the processing, an enhanced output image of approximately one or more respectively same regions of the scene.

5. A method as in claim 1, further comprising, based on said selectively applying image analysis, adjusting an image acquisition parameter and repeating the method for a second distorted image, and generating, based on the second distorted image, a second set of one or more reconstructed regions of approximately one or more respectively same regions of said scene as the first set of one or more reconstructed regions.

6. A method as in claim 5, further comprising processing the first and second sets of one or more reconstructed regions of approximately one or more respectively same regions of scene, and generating, based on the processing, an enhanced output image of approximately one or more respectively same regions of the scene.

7. A method as in claim 1, responsive to said analysis and said pixel quality selectively applying image enhancement and generating an enhanced output image.

8. A digital image acquisition device, comprising:
a non-linear, wide-angled lens and an imaging sensor configured to capture digital images of scenes containing one or more off-center peripheral regions, including an initial distorted image with a large field of view;
a processor;
a memory having code embedded therein for programming the processor to perform a method of enhancing a first scene containing one or more off-center peripheral regions, wherein the method comprises:
extracting one or more distorted regions within said initial distorted image in accordance with known distortion characteristics of a configuration of the non-linear, wide-angled lens and the imaging sensor;
applying a geometric correction to reconstruct said one or more distorted regions into an approximately rectangular frame of reference as a one or more respectively reconstructed regions within said large field of view and corresponding to one or more off-center reconstructed regions of a scene captured as said initial distorted image, said one or more off-center reconstructed regions having been imaged through a different region of the non-linear, wide angled lens than a center region, and said one or more off-center reconstructed regions having been captured as one or more groups of pixels at one or more different regions of said same imaging sensor that has also captured a non-distorted or less-distorted center region within said large field of view;

determining a quality of reconstructed pixels, relative to pixels of the initial distorted image, within said one or more reconstructed regions; and selectively applying image analysis to said one or more reconstructed regions based on the quality of the reconstructed pixels.

9. A device as in claim 8, wherein the method comprises compensating for global motion of an image acquisition system.

10. A device as in claim 8, wherein the method comprises repeating the method for a second distorted image, and generating a second set of one or more reconstructed regions of approximately one or more respectively same regions of said scene as the first set of one or more reconstructed regions.

11. A device as in claim 10, wherein the method comprises, responsive to analysis of the first and second sets of one or more reconstructed regions processing both the first and second sets of one or more reconstructed regions and generating, based on the processing, an enhanced output image of approximately one or more respectively same regions of the scene.

12. A device as in claim 8, wherein the method comprises, based on said selectively applying image analysis, adjusting an image acquisition parameter and repeating the method for a second distorted image, and generating, based on the second distorted image, a second set of one or more reconstructed regions of approximately one or more respectively same regions of said scene as the first set of one or more reconstructed regions.

13. A device as in claim 12, wherein the method comprises processing the first and second sets of one or more reconstructed regions of approximately one or more respectively same regions of the scene, and generating, based on the processing, an enhanced output image of approximately one or more respectively same regions of the scene.

14. A device as in claim 8, wherein the method comprises, responsive to said analysis and said pixel quality, selectively applying image enhancement and generating an enhanced output image.

15. One or more non-transitory, processor-readable storage media having code embedded therein for programming a processor to perform a method of enhancing a scene captured with a non-linear, wide-angled lens and containing one or more off-center peripheral regions, wherein the method comprises:
extracting one or more distorted regions within an initial distorted image in accordance with known distortion characteristics of a configuration of the non-linear, wide-angled lens and an imaging sensor;
applying a geometric correction to reconstruct said one or more distorted regions into an approximately rectangular frame of reference as a one or more respectively reconstructed regions within said large field of view and corresponding to one or more off-center reconstructed regions of a scene captured as said initial distorted image, said one or more off-center reconstructed regions having been imaged through a different region of the non-linear, wide angled lens than a center region, and said one or more off-center reconstructed regions having been captured as one or more groups of pixels at one or more different regions of said same imaging sensor that has also captured a non-distorted or less-distorted center region within said large field of view;

determining a quality of reconstructed pixels, relative to pixels of the initial distorted image, within said one or more reconstructed regions; and selectively applying image analysis to said one or more reconstructed regions based on the quality of the reconstructed pixels.

16. One or more non-transitory, processor-readable storage media as in claim 15, wherein the method comprises compensating for global motion of an image acquisition system.

17. One or more non-transitory, processor-readable storage media as in claim 15, wherein the method comprises repeating the method for a second distorted image, and generating a second set of one or more reconstructed regions of approximately one or more respectively same regions of said scene as the first set of one or more reconstructed regions.

18. One or more non-transitory, processor-readable storage media as in claim 17, wherein the method comprises, responsive to analysis of the first and second sets of one or more reconstructed regions processing both the first and second sets of one or more reconstructed regions and generating, based on the processing, an enhanced output image of approximately one or more respectively same regions of the scene.

19. One or more non-transitory, processor-readable storage media as in claim 15, wherein the method comprises, based on said selectively applying image analysis, adjusting an image acquisition parameter and repeating the method for a second distorted image, and generating, based on the second distorted image, a second set of one or more reconstructed regions of approximately one or more respectively same regions of said scene as the first set of one or more reconstructed regions.

20. One or more non-transitory, processor-readable storage media as in claim 19, wherein the method comprises processing the first and second sets of one or more reconstructed regions of approximately one or more respectively same regions of the scene, and generating, based on the processing, an enhanced output image of approximately one or more respectively same regions of the scene.

21. One or more non-transitory, processor-readable storage media as in claim 15, wherein the method further comprises, responsive to said analysis and said pixel quality, selectively applying image enhancement and generating an enhanced output image.

22. Within a digital image acquisition system comprising a non-linear, wide-angled lens and an imaging sensor, a method of enhancing a scene containing one or more off-center peripheral regions, the method comprising:

using a processor;

acquiring an initial distorted image with a large field of view, including using a non-linear, wide-angled lens and an imaging sensor;

determining and extracting an off-center region of interest (hereinafter "ROI") within said initial distorted image;

applying a geometric correction to reconstruct said off-center ROI into an approximately rectangular frame of reference as a reconstructed ROI;

determining a quality of reconstructed pixels, relative to pixels of the initial distorted image, within said reconstructed ROI;

selectively applying image analysis to said reconstructed ROI based on the quality of the reconstructed pixels; and repeating the method for a second distorted image, and generating a second reconstructed ROI of approximately a same portion of an image scene as the first reconstructed ROI.

23. A method as in claim 22, further comprising, responsive to analysis of the first and second reconstructed ROIs, processing both the first and second reconstructed ROIs and generating, based on the processing, an enhanced output image of substantially the same portion of the image scene.

24. Within a digital image acquisition system comprising a non-linear, wide-angled lens and an imaging sensor, a method of enhancing a scene containing one or more off-center peripheral regions, the method comprising:

using a processor;

acquiring an initial distorted image with a large field of view, including using a non-linear, wide-angled lens and an imaging sensor;

determining and extracting an off-center region of interest (hereinafter "ROI") within said initial distorted image;

applying a geometric correction to reconstruct said off-center ROI into an approximately rectangular frame of reference as a reconstructed ROI;

determining a quality of reconstructed pixels, relative to pixels of the initial distorted image, within said reconstructed ROI;

selectively applying image analysis to said reconstructed ROI based on the quality of the reconstructed pixels; and based on said selectively applying image analysis, adjusting an image acquisition parameter and repeating the method for a second distorted image, and generating, based on the second distorted image, a second reconstructed ROI of approximately a same portion of an image scene as the first reconstructed ROI.

25. A method as in claim 24, further comprising processing the first and second reconstructed ROIs of approximately the same portion of the image scene, and generating, based on the processing, an enhanced output image of substantially the same portion of the image scene.

26. A digital image acquisition device, comprising:

a non-linear, wide-angled lens and an imaging sensor configured to capture digital images of scenes containing one or more off-center peripheral regions, including an initial distorted image with a large field of view;

a processor;

a memory having code embedded therein for programming the processor to perform a method of enhancing a scene containing one or more off-center peripheral regions, wherein the method comprises:

determining and extracting an off-center region of interest (hereinafter "ROI") within said initial distorted image;

applying a geometric correction to reconstruct said off-center ROI into an approximately rectangular frame of reference as a reconstructed ROI;

determining a quality of reconstructed pixels, relative to pixels of the initial distorted image, within said reconstructed ROI; selectively applying image analysis to said reconstructed ROI based on the quality of the reconstructed pixels, and repeating the method for a second distorted image, and generating a second reconstructed ROI of approximately a same portion of an image scene as the first reconstructed ROI.

27. A device as in claim 26, wherein the method comprises, responsive to analysis of the first and second reconstructed ROI, processing both the first and second reconstructed ROIs and generating, based on the processing, an enhanced output image of substantially the same portion of the image scene.

28. A digital image acquisition device, comprising:
a non-linear, wide-angled lens and an imaging sensor configured to capture digital images of scenes containing one or more off-center peripheral regions, including an initial distorted image with a large field of view;
a processor;
a memory having code embedded therein for programming the processor to perform a method of enhancing a scene containing the one or more off-center peripheral regions, wherein the method comprises:
determining and extracting an off-center region of interest (hereinafter "ROI") within said initial distorted image;
applying a geometric correction to reconstruct said off-center ROI into an approximately rectangular frame of reference as a reconstructed ROI;
determining a quality of reconstructed pixels, relative to pixels of the initial distorted image, within said reconstructed ROI; selectively applying image analysis to said reconstructed ROI based on the quality of the reconstructed pixels, and
based on said selectively applying image analysis, adjusting an image acquisition parameter and repeating the method for a second distorted image, and generating, based on the second distorted image, a second reconstructed ROI of approximately a same portion of an image scene as the first reconstructed ROI.

29. A device as in claim 28, wherein the method comprises processing the first and second reconstructed ROIs of approximately the same portion of the image scene, and generating, based on the processing, an enhanced output image of substantially the same portion of the image scene.

30. One or more non-transitory, processor-readable storage media having code embedded therein for programming a processor to perform a method of enhancing a scene captured with a non-linear, wide-angled lens and containing one or more off-center peripheral regions, wherein the method comprises:
determining and extracting an off-center region of interest (hereinafter "ROI") within an initial distorted image captured with a large field of view;
applying a geometric correction to reconstruct said off-center ROI into an approximately rectangular frame of reference as a reconstructed ROI;
determining a quality of reconstructed pixels, relative to pixels of the initial distorted image, within said reconstructed ROI;
selectively applying image analysis to said reconstructed ROI based on the quality of the reconstructed pixels; and
repeating the method for a second distorted image, and generating a second reconstructed ROI of approximately a same portion of an image scene as the first reconstructed ROI.

31. One or more non-transitory, processor-readable storage media as in claim 30, wherein the method comprises, responsive to analysis of the first and second reconstructed ROIs, processing both the first and second reconstructed ROIs and generating, based on the processing, an enhanced output image of substantially the same portion of the image scene.

32. One or more non-transitory, processor-readable storage media having code embedded therein for programming a processor to perform a method of enhancing a scene captured with a non-linear, wide-angled lens and containing one or more off-center peripheral regions, wherein the method comprises:
determining and extracting an off-center region of interest (hereinafter "ROI") within an initial distorted image captured with a large field of view;
applying a geometric correction to reconstruct said off-center ROI into an approximately rectangular frame of reference as a reconstructed ROI;
determining a quality of reconstructed pixels, relative to pixels of the initial distorted image, within said reconstructed ROI;
selectively applying image analysis to said reconstructed ROI based on the quality of the reconstructed pixels, and
based on said selectively applying image analysis, adjusting an image acquisition parameter and repeating the method for a second distorted image, and generating, based on the second distorted image, a second reconstructed ROI of approximately a same portion of an image scene as the first reconstructed ROI.

33. One or more non-transitory, processor-readable storage media as in claim 32, wherein the method comprises processing the first and second reconstructed ROIs of approximately the same portion of the image scene, and generating, based on the processing, an enhanced output image of substantially the same portion of the image scene.

* * * * *